(12) United States Patent
Tung

(10) Patent No.: US 9,678,928 B1
(45) Date of Patent: Jun. 13, 2017

(54) WEBPAGE PARTIAL RENDERING ENGINE

(71) Applicant: Michael Tung, Mountain View, CA (US)

(72) Inventor: Michael Tung, Mountain View, CA (US)

( * ) Notice: Subject to any disclaimer, the term of this patent is extended or adjusted under 35 U.S.C. 154(b) by 536 days.

(21) Appl. No.: 14/043,761

(22) Filed: Oct. 1, 2013

(51) Int. Cl.
*G06F 17/00* (2006.01)
*G06F 17/22* (2006.01)
*G06F 17/30* (2006.01)

(52) U.S. Cl.
CPC .... *G06F 17/2247* (2013.01); *G06F 17/30861* (2013.01); *G06F 17/30899* (2013.01)

(58) Field of Classification Search
CPC ......... G06F 17/30899; G06F 17/30861; G06F 17/2247
See application file for complete search history.

(56) References Cited

U.S. PATENT DOCUMENTS

| | | | | |
|---|---|---|---|---|
| 6,345,279 | B1 * | 2/2002 | Li | G06F 17/30905 |
| 8,020,993 | B1 | 9/2011 | Fram | |
| 8,977,653 | B1 * | 3/2015 | Mahkovec | G06F 17/30899 |
| | | | | 707/769 |
| 2003/0122870 | A1 | 7/2003 | Aggarwal | |
| 2005/0243054 | A1 | 11/2005 | Beymer | |
| 2006/0123361 | A1 | 6/2006 | Sorin | |
| 2006/0236230 | A1 * | 10/2006 | Lin | G06F 17/211 |
| | | | | 715/210 |
| 2006/0256133 | A1 | 11/2006 | Rosenberg | |
| 2007/0122000 | A1 | 5/2007 | Venetianer | |
| 2007/0124110 | A1 | 5/2007 | Tung | |
| 2008/0295129 | A1 | 11/2008 | Laut | |
| 2010/0030780 | A1 * | 2/2010 | Eshghi | G06F 17/30271 |
| | | | | 707/758 |
| 2011/0126113 | A1 | 5/2011 | Sharma | |
| 2015/0016693 | A1 | 1/2015 | Gattuso | |

OTHER PUBLICATIONS

Pneuli et al., Web Page Layout Via Visual Segmentation, Jul. 21, 2009, Hewlett-Packard Development Company, LP., pp. 1-5.
Jiang et al., Mapping Low-Level Features to High-Level Semantic Concepts in Region-Based Image Retrieval, Jun. 20-25, 2005, IEEE Computer Society Conference on Computer Vision and Pattern Recognition, vol. 2, pp. 244-249.
Kovacevic et al., Recognition of Common Areas in a Web Page Using Visual Information: a possible application in a page classification, Dec. 9-12, 2002, IEEE 2002 International Conference on Data Mining. pp. 250-257.

* cited by examiner

*Primary Examiner* — Andrew McIntosh

(57) ABSTRACT

According to some embodiments, the present technology is directed to a method for rendering a webpage. The method comprises receiving a URL of the webpage and fetching a file from a server designated by the URL, the fetched file including source code describing the webpage. The method further includes parsing the source code to catalog resources used for rendering the webpage and determining a priority for each resource. For each resource, the method includes fetching the resource if the priority exceeds a threshold, and omitting the resource if the priority does not exceed the threshold. The method also includes generating a representation of the webpage using the fetched resources, the generated representation being a transformation of an intended representation for the webpage.

24 Claims, 8 Drawing Sheets

WEBPAGE PARTIAL RENDERING ENGINE

FIELD OF THE PRESENT TECHNOLOGY

The present technology relates generally to webpage rendering engines, browsers, search engine web crawlers, and rendering engine training.

BACKGROUND

Webpage rendering engines are the software components within a browser that are responsible for downloading source code for a webpage at a URL and transforming the source code and related resources into a viewable representation of the webpage that can be seen by humans. Examples of webpage rendering engines and frameworks include Webkit (which powers Google Chrome and Apple's Safari, and Opera Browser), Gecko (which powers Mozilla Firefox), and Trident (which powers Internet Explorer).

Steps that are performed by a typical web rendering engine include receiving a URL as input, fetching files (that include source code) from the input URL, and fetching related resources, such as Cascading Style Sheets (CSS) stylesheets, Javascripts, Images, AJAX, embedded documents—iframes, etc. The steps further include parsing and interpreting the source code, which are written in various programming languages and digital representations. Other steps include forming a model of the document, also referred to as a Document Object Model (DOM), and applying style rules to generate a 2D layout. Finally a faithful representation of the webpage is painted to an actual or virtual screen for an end user. Generally, a faithful representation of the webpage is considered to be a representation that uses all related resources referenced in the files fetched from URL that were intended in the design of the webpage to be used for rendering the webpage. Other terms for faithful representation are intended representation, conventional representation, or typical representation. The terms "object" and "resource" are used interchangeably in the present disclosure.

Latency is generally considered to be the amount of time it takes from when input is provided to the rendering engine until the rendered DOM is ready. The latency time is typically triggered by input of a URL. However, latency time may also be triggered by input such as a mouse click/form, a form input, or a scheduled event. Latency is generally attributed to Internet conditions such as bandwidth of the Internet, bandwidth of internet service providers, and delays internal to the servers that impact servicing requests for access to URL files and related resources. These conditions are generally beyond the control of rendering engines.

SUMMARY

According to some embodiments, the present technology reduces latency in rendering a webpage by rendering a partial representation of the webpage instead of a faithful representation. The partial representation may be rendered by selecting some of the resources intended to be used in rendering the webpage and omitting other intended resources from the partial representation of the webpage. The resources may be selected by assigning a priority to each of the resources and evaluating the priority to determine whether or not to fetch the resource. The priority for each resource may be calculated based on features of the resource. In some embodiments, rules are applied to features of the resource to determine the priority of the resource. A model may be used for determining the resource priorities and a training set of URL's may be used for optimizing the model. An intended representation of the webpage may be compared with the partial representation of the webpage to generate difference metrics. The difference metrics may be used for training the model.

According to some embodiments, the present technology may be directed to a system rendering a webpage. The system includes a fetcher configured to receive a URL of the webpage and fetch a file from a server designated by the URL, the file including source code describing the webpage and a parser module configured to parse the source code to catalog objects used for rendering the webpage. The system further includes a feature extractor configured to extract a plurality of features from the cataloged objects, a prioritizer configured to assign a feature value to each of the extracted features of each object, and a priority generator configured to calculate a resource priority for each object based on the feature values assigned to the object. A resource manager is configured to determine for each object if the object is to be selected for rendering the webpage or omitted from use in rendering the webpage, the decision based on the calculated resource priority for the object. The resource manager may be further configured to fetch the objects selected for rendering the webpage. A model engine may be configured to generate a document object model using the fetched objects and calculated priority for the respective object and a serializer may be configured to render a partial representation of the webpage using the document object model and the fetched objects.

According to other embodiments, the present technology is directed to a method for training a webpage rendering engine. The method includes fetching a file from a server designated by the URL, the file including source code describing the webpage and generating an intended representation of the webpage using a conventional rendering engine. The conventional rendering engine is configured for parsing the source code, cataloging resources intended to be used for rendering the webpage, and fetching all the resources intended to be used for rendering the webpage. The method also includes generating a transform of the intended representation for the webpage, the transform representation generated using a partial rendering engine. The partial rendering is configured for parsing the source code and cataloging resources intended to be used for rendering the webpage. The partial rendering engine is further configured for calculating a priority for each of the cataloged resources using a parameter array, selecting resources to be fetched based on the calculated priorities, the selected resources not including all the resources intended to be used, and fetching the selected resources. The method further includes calculating a difference metric between the intended representation and the transform representation and adjusting the parameter array based on the difference metric.

According to additional embodiments, the present technology may be directed to non-transitory computer readable storage mediums having a computer program embodied thereon. The computer program executable by a processor in a computing system to perform a method for rendering a webpage that includes the steps of receiving a URL of the webpage, fetching a source code from a server indicated by the URL, the source code describing the webpage, and parsing the source code to catalog resources used for rendering the webpage. The method further includes assigning a timeout period for fetching each of the resources based on features of the respective resource. For each resource, the method also includes initiating a fetch of the resource and terminating the fetch without the resource if the assigned timeout period for the resource has elapsed before completing the fetch of the resource, and rendering a partial representation of the webpage, the partial representation including the fetched resources and omitting the resources for which the timeout period for the resource elapsed before completing the fetch of the resource. The method further includes scaling or offsetting the timeout periods for the resources based on performance of the Internet, network, website, server, and/or the like.

BRIEF DESCRIPTION OF THE DRAWINGS

Certain embodiments of the present technology are illustrated by the accompanying figures. It will be understood that the figures are not necessarily to scale and that details not necessary for an understanding of the technology or that render other details difficult to perceive may be omitted. It will be understood that the technology is not necessarily limited to the particular embodiments illustrated herein.

DETAILED DESCRIPTION

Figure 1:
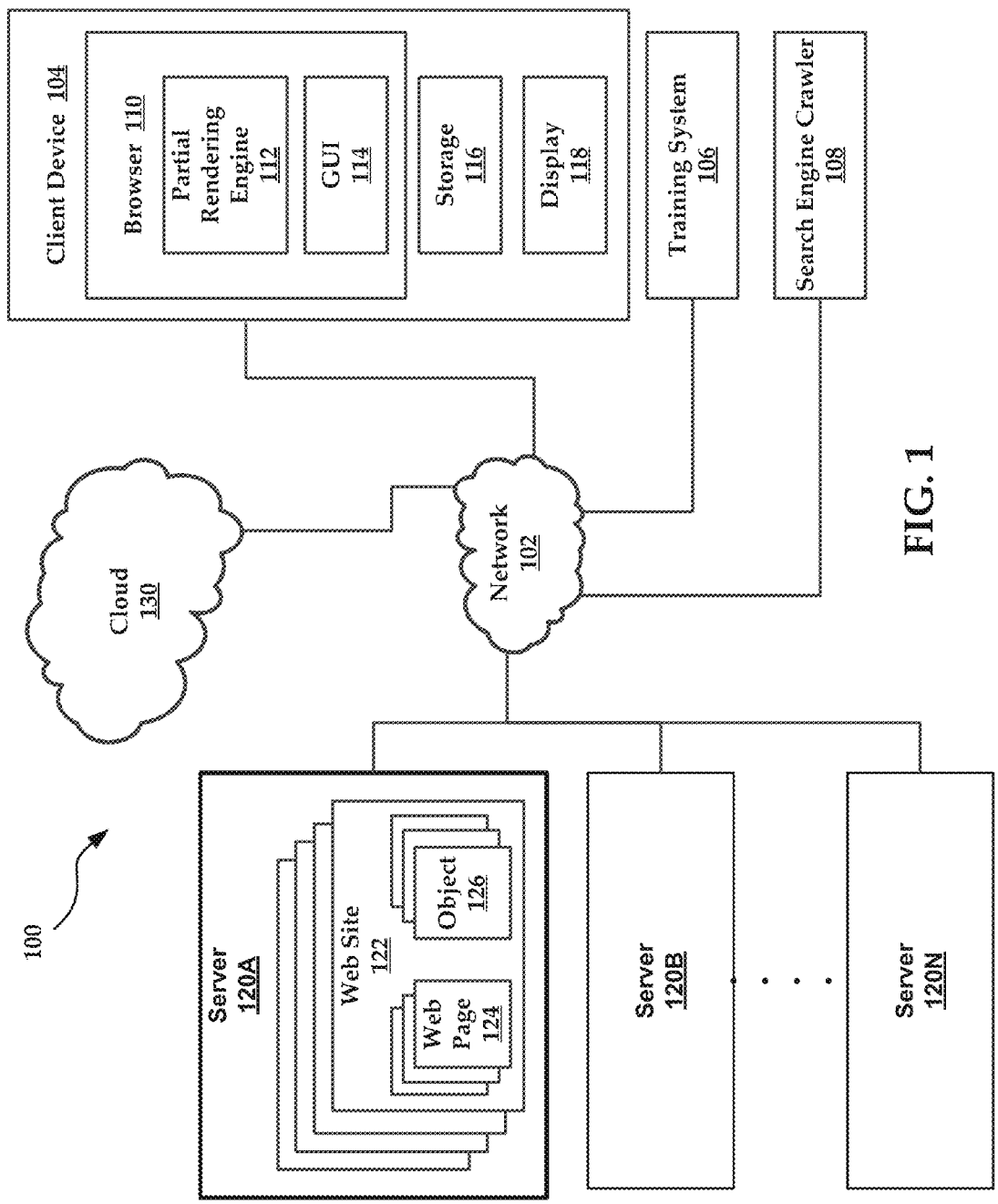
FIG. 1 illustrates an exemplary architecture for practicing aspects of the technology.

The terminology used herein is for the purpose of describing particular embodiments only and is not intended to be limiting of the present technology. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more of the same or other features, integers, steps, operations, elements, components, and/or groups thereof.

It will be understood that like or analogous elements and/or components referred to herein may be identified throughout the drawings with like reference characters. It will be further understood that several of the figures are merely schematic representations of the present technology. As such, some of the components may have been distorted from their actual scale for pictorial clarity.

In the present disclosure, the terms "approximate rendering engine" and "partial rendering engine," are used interchangeably, as are "approximate render" and "partial render." Similarly, the terms "approximate representation," "partial representation," and "transform representation" are used interchangeably. The terms "download" and "fetch" are used interchangeably to indicate a fetch. The terms "resource" and "object" are generally used interchangeably throughout this description. Cataloging may be done in a manner similar to a traditional rendering engine.

An approximate rendering engine or partial rendering engine may improve performance and reduce latency of rendering a webpage by determining a priority for each of the resources, then fetching the resources based on the determined priority. The priority of the resources may be determined based on needs or interests of an end user viewing the webpage, rather than the intent of a source or designer of the webpage. The approximate rendering engine may use a priority index or array to aid in evaluating features of the resources, and calculating which of the resources to fetch based on the evaluation. The evaluation of the features may be rule based and/or use various forms of analysis (e.g., statistical, vector, tree, mathematical, transforms, and/or the like), again based on the needs and interests of the user. The priority array of the approximate or partial rendering engine may be trained by using a corpus of URL's to compare a faithful representation of the webpages against partial representation based on a prioritized or partial rendering and calculating the differences. Models or parameters may be updated based on the calculated differences.

This technology is useful in today's world of mobile devices and other devices subject to low-bandwidth and high-latency network connections. In general, webpages on the Internet were created and intended to be displayed in the context of Internet-connected Desktop PCs. Typically, Internet-connected Desktop PCs enjoy a relatively high bandwidth and a large screen size having a high resolution. However, viewing webpages on mobile devices (e.g., smart phones, netbooks, tablets, ipods, iphones, ipads, and/or the like) can be difficult because the format and size of the screen is much smaller than devices on which webpages were intended to be viewed. This is because mobile devices generally have smaller screens, communicate over connections with slower throughput and higher latency, use more expensive bandwidth, and have slower CPUs and memory. Moreover, mobile devices often incur substantial charges for data transfer and connect time. Solutions such as increasing bandwidth and decreasing charges may provide only small incremental improvements that are likely to be offset by increasing the screen size and resolution.

Unfortunately, these conditions are beyond the control of a rendering engine. However, the currently disclosed solution takes a different approach that can in some instances provide orders of magnitude improvements. In some embodiments, a trade-off of performance (speed of rendering the output) with fidelity of the output provides valuable improvements in performance and reductions in latency without reducing availability of useful information to an end user. An approximate rendering of a webpage can be performed quickly because it initially fetches fewer resources and objects having high priority features of interest to the user. Rendering a webpage quickly may be more useful than waiting for a faithful rendering of all the resources and objects according to an intent of the webpage design. Moreover, rendering objects that are too small to be discernable on a mobile device display may not be useful. Omitting such objects may be more useful than investing time and/or expense in rendering them. Optionally, fidelity of the rendering can be increased on demand or as additional features and objects are fetched.

Another embodiment of an approximate rendering engine includes an end user that does not require a faithful rendering of a webpage. An example is a search engine crawler that accesses webpages to obtain useful information. The search engine crawler may render webpages to obtain information about webpage layout and fetch resources that are included via AJAX or iframes. However, it turns out that not all the information on a webpage that was intended to be rendered for humans is also useful to a search engine crawler. Thus, search engine crawlers, which visit vast numbers of webpages, may not require all the information in pages that are faithfully rendered for human consumption. Valuable time may be saved by using an approximate rendering engine to perform a partial render that does not fetch all the resources. Depending on the settings of a priority array of the approximate rendering engine, latency may be reduced by several orders of magnitude.

The approximate rendering engine may catalog the resources needed to render the page. In various embodiments, resources or objects include blocks of text, images, graphics, links, URL's, apps, executable code, animations, audio, video, advertising, games, charts, forms, banners, splash pages, cookies, databases, style sheets, arrays, social widgets, tables, javascripts, plug-ins, and/or the like.

The approximate rendering engine may then determine features of the cataloged resources and assign a priority value to each of the cataloged resources. Features for resources include various aspects, characteristics, metrics, traits or attributes of the resource. A resource may have one feature or a plurality of features. Priorities may be calculated and/or assigned to various resources based on the evaluated features of the resources. The priority value may be used to determine whether or not to fetch the resource. For example, the approximate rendering engine may determine that the resource has no impact on final rendering. Examples include javascript code that performs 3rd party ad tracking, images, code that handles animations, code for handling mouse interactions (which are not applicable to mobile devices), code for handling touch screens, cookie management code, cookies, and/or the like. The assigned priority values may be used to determine an order for fetching resources. A timeout for fetching the resource may be based on a priority assigned to the resource. That is, when a timeout period has elapsed before the resource has been received, the approximate rendering engine may give up on fetching that resource.

An algorithm for assigning priority values can be implemented in various ways. In one embodiment, the priority value of each resource can be determined using a set of rules. Examples of various rules include:

If the URL of the request contains a known ad host (e.g. doubleclick.net, adroll), assign a value of 0 (in one embodiment of the invention, this may indicate that the resource should not be retrieved)

If the URL of the request contains a known analytics hosts (e.g. Google analytics, clicky),—assign a value >0

If the URL is to a CSS stylesheet, assign a high priority (CSS files may have a big impact on final layout)

If the header of the resource indicates "image/(gif|jpg-|png)" the resource is likely an image, assign a medium-valued priority value (image sizes moderately affect final layout dimensions)

If the time of the request is after the download event, assign a value→0 (events that happen after download are less likely to affect layout)

If the header of the resource indicates a modification date not later than the last fetch, the resource may be retrieved from a cache Another embodiment includes determining resource priority using statistical machine learning. In this embodiment, training data may be used to find an optimal method of determining priority. For example, a training set of URL's may be rendered using an approximate rendering engine and a traditional rendering engine. For each URL, an objective function (e.g., cost function) may be used to calculate a difference between a DOM rendered using the approximate rendering engine and the faithfully rendered DOM from a traditional renderer. An example of such a cost function is an aggregate Euclidean distance (L2 norm) between each rectangle in a first (approximate) DOM and its associated rectangle in a second (faithful) DOM. A machine learning method may optimize a priority-determining function with respect to the cost function using the training set. The priority-determining function can be parameterized using a plurality of features of the resource requested. Example features include:

URL features: hostname, protocol, port, number of levels (slashes) in path, filetype extension, is hostname a known adserver/analytics, is URL on a CDN or external site Header: content-type, filesize (content-length)

Timing information: time the resource was requested relative to invocation; was it triggered by another resource The IP address or hostname can be used to estimate a network distance to the resource that may predict fetching time Training sets may be prepared in advance by assembling a sample of representative webpages. Training sets may be stored in local or remote memory. A machine learning routine may optimize parameters of an approximate rendering engine to minimize latency in performing approximate rendering using the set. Training sets may also be streamed from an application. A training set can also be passed in dynamically in a running service. The service may use recently passed-in workloads to self-optimize itself on the current stream of URLs as it is processing them.

Another embodiment includes a self-optimizing proxy server. Proxy servers may be used by mobile operators and ISPs to reduce bandwidth demand and improve web experiences for mobile phone users by using caching and compression. Webpages generally pass through proxy servers in a manner that is transparent to the end client.

While this technology is susceptible of embodiment in many different forms, there is shown in the drawings, and will herein be described in detail, several specific embodiments with the understanding that the present disclosure is to be considered as an exemplification of the principles of the technology and is not intended to limit the technology to the embodiments illustrated. The above advantages and other advantages of the present technology are provided in greater detail with reference to the drawings.

FIG. 1 is a block diagram of an exemplary architecture 100 in which embodiments of the present technology may be practiced. According to various embodiments, the architecture 100 includes a network 102, a client device 104, a training system 106, a search engine crawler 108, one or more servers 120, and/or a cloud 130.

The server 120 of FIG. 1 is illustrated as having multiple servers 120A-120N. However, for brevity and simplicity, the servers 120A-120N may be collectively and/or individually referred to as server(s) 120. The client device 104 may be communicatively coupled with server 120 via a network 102, which may include any of a local area network ("LAN"), a wide area network ("WAN"), wifi, blue tooth, hotspot or any other private or public network, such as the Internet. The network 102 may also include a telecommunications network.

Figure 7:
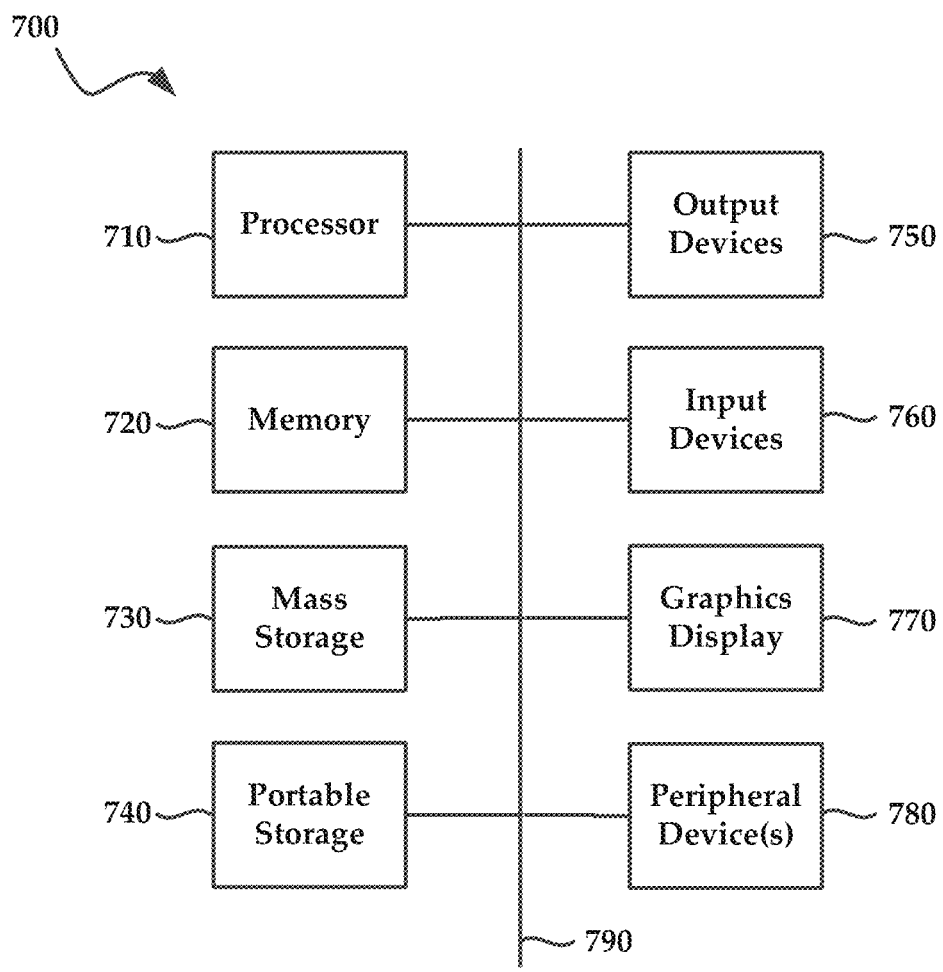
FIG. 7 is a block diagram of an exemplary computing system that may be utilized to practice aspects of the present disclosure.

According to some embodiments, server 120 may include any computing device, such as a computing device 700 of FIG. 7, described in more detail elsewhere herein. Each server 120 may include one or more processors such as one or more processors 710 of FIG. 7, and memory for storing executable instructions (e.g., logic) such as main memory 720 of computing device 700. This logic, when executed by the one or more processors, is operable to perform operations, including the exemplary methods described elsewhere herein.

In some instances, the functions of the server 120 are implemented within a cloud-based computing environment. The server 120 may be communicatively coupled via a network 102 with a cloud based computing environment, e.g., cloud 130. In general, a cloud-based computing environment, such as cloud 130, is an internet resource that typically combines the computational power of a large model of processors and/or that combines the storage capacity of a large model of computer memories or storage devices. For example, systems that provide a cloud resource may be utilized exclusively by their owners; or such systems may be accessible to outside users who deploy applications within the computing infrastructure to obtain the benefit of large computational or storage resources.

The server 120A may be representative of any of the multiple servers 120A-120N illustrated in FIG. 1. The server 120A may host one or more websites 122. Each of the one or more websites 122 may include one or more webpages 124 and/or one or more objects 126. The objects 126 may be used individually or shared in rendering any of the webpages 124 on any of servers 120A-120N. In addition to the websites 122, the objects 126 may generally be accessed from elsewhere on the server 120A and/or from the cloud 130. The objects 126 may be stored in server memory and/or server mass storage, which is described elsewhere herein. The objects 126 may be stored in memory and/or mass storage in cloud 130, which is described elsewhere herein.

The cloud 130 may be formed, for example, by a network of servers (e.g., servers 120) with each server (or at least a plurality thereof) providing processor and/or storage resources. These servers may manage workloads provided by multiple users (e.g., cloud resource consumers or other users). Typically, each user places workload demands upon the cloud that vary in real-time, sometimes dramatically. The nature and extent of these variations typically depend on the type of business associated with the user.

In various embodiments, the client device 104 includes an end user computing device such as a desktop computer, a mobile computing device, a laptop, a netbook, a smart phone, a tablet, a cell phone, ipod, ipad, iphone or any other device capable of displaying webpages using a graphical user interfaces and allowing an end user to interact with such GUIs. The client device 104 may also be implemented using a server, e.g., server 120. The client device 104 of FIG. 1 includes a browser 110, storage 116 and a display 118. The browser 110 may use a partial rendering engine 112 and a Graphical User Interface (GUI) 114 for rendering and displaying a webpage 124 on the display 118. The GUI 114 may receive a URL of a webpage for rendering using the partial rendering engine 112 and displaying on the display 118. In some embodiments, the URL is received from other software components running on the client device 104. The storage 116 may be used for storing parameters, data, URL's and resources used by the browser 110 for rendering and displaying webpages. In various embodiments, the storage 116 includes main memory, mass storage, portable memory, cloud memory, computer-readable storage media, and/or the like, as described elsewhere herein.

The search engine crawler 108 may construct a virtual representation or snapshot of data in an architecture, such as architecture 100. The training system 106 may use partial or optimized rendering of a plurality of webpages 124 and an ideal or faithful rendering of those webpages 124 for training rendering engines, such as the partial rendering engine 112.

Figure 2:
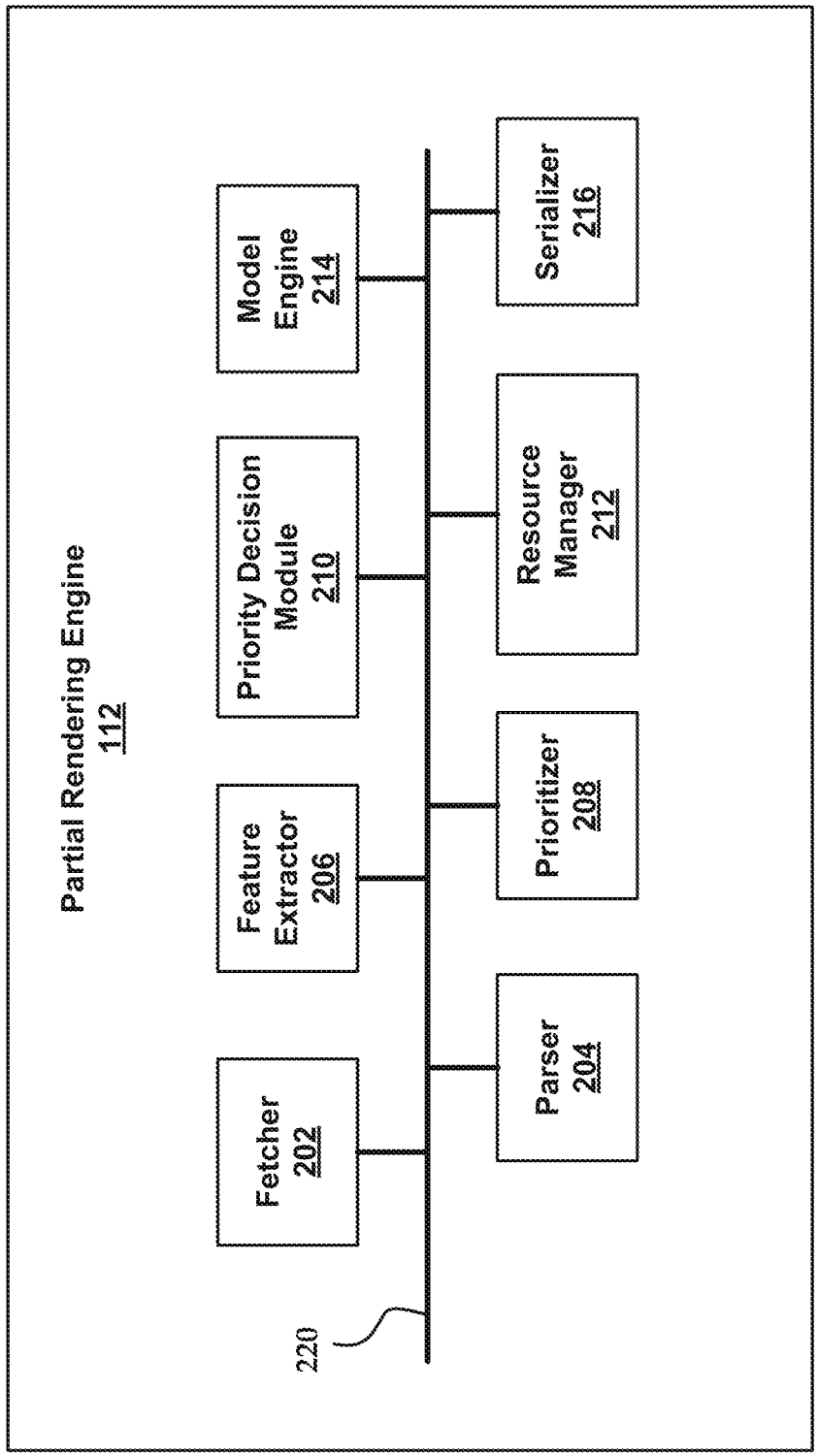
FIG. 2 is a block diagram illustrating details of a rending engine of FIG. 1, in accordance with various aspects of the technology.

FIG. 2 is a block diagram illustrating details of the partial rendering engine 112 of FIG. 1 in accordance with various aspects of the technology. The partial rendering engine 112 includes modules and/or hardware including a fetcher 202, a parser 204, a feature extractor 206, a prioritizer 208, a priority generator 210, a resource manager 212, a model engine 214, and a serializer 216. The components shown in FIG. 2 are depicted as being connected via a single bus 220. The components may be connected through one or more data transport means, including a local microprocessor bus and/or one or more input/output (I/O) buses. The components may be distributed among multiple devices and/or servers 120, and configured to communicate via the network 102 and/or wireless systems. Various blocks may be combined. Functions of some blocks may be performed by others. Some blocks may be divided into separate functions.

The fetcher 202 is configured to receive a URL, e.g., from the GUI 114. The URL may indicate a webpage 124 on a website 122 of a server 120, e.g., server 120A. The fetcher is further configured to fetch a webpage file from the URL. The webpage file generally includes source code describing the webpage. In various embodiments, the fetched webpage file includes Hyper Text Markup Language (HTML), Javascripts, URL's, graphics, style sheets, resources and objects, hyperlinks, and/or the like. Resources may be embedded in the fetched webpage file. Some resources may be objects residing on other webpages 124 of the website 122 or other websites 122 of server 124A. In some embodiments, resources include objects residing on the website 122 of server 120A, for example on the webpage 124. In various embodiments, resources are objects on other servers 120 (e.g., servers 120B-120N) or in the cloud 130, and/or other clouds. The fetcher 202 may fetch the webpage file via the network 102 or from storage 116.

The parser 204 is configured to read source code in the file fetched by the fetcher 202 and perform a lexicographic analysis. The parser 204 is further configured to parse and interpret the source code. For example, the parser may parse the source code into HTML, Javascript, and/or CSS, and determine tree structures for interpreting the source code. Parsing and/or interpreting the source code includes cataloging resources or objects used for rendering the webpage.

The feature extractor 206 is configured to identify features for each object. Features for objects include some aspect, characteristic, metric, trait or attribute of the object. An object may have one feature or a plurality of features. For example, attributes of text include font type, font size, font style (italics, bold, color, underline, etc.), font effects (strikethrough, double strikethrough, superscript, subscript, outline, shadow, small caps, all caps emboss, engrave, hidden, etc.), bullets, outline, tabs, leading, justification, case, and/or the like. An example of features for images include type of image (GIF, JPEG, PNG, TIFF, BMP, PSD, EPS, PDF, PICT, PXR, PNG, SCT, VST, AND/OR THE LIKE), file size, pixel size, image dimensions, and/or the like. An example of features for URL's include host name, protocol, port, number of levels in path, file type extension, is hostname a known adserver/analytics, is URL on a CDN or external site, revision, recent previous access date and/or time, and/or the like. Examples of features for files include header, content-type, file size, timing information, revision, creation date and time, and/or the like. The above list of features is merely exemplary and not to be considered to be limiting or limited to or for the associated objects.

The prioritizer 208 and priority generator 210 are configured to determine a priority for each resource. A resource priority may be represented by a numeric value, string value, categorical value, Boolean value (1 or 0), date value, time value, and/or the like. The resource priority may be used to determine whether or not to fetch the resource. Alternatively, the resource priority may is to determine an order for fetching resources. In some embodiments, the resource priority is used to determine both whether or not each resource is fetched and an order for the fetched resources.

In some embodiments, the prioritizer 208 and priority generator 210 are configured to determine a priority for each resource based on an analysis of one or more features for the resource. For example, the priority value of each resource can be determined using a set of rules to analyze the one or more features. Examples of various rules include:

- If the URL of the request contains a known ad host (e.g. doubleclick.net, adroll), assign a value of 0 (the resource will not be retrieved)
- If the URL of the request contains a known analytics hosts (e.g. Google analytics, clicky)—assign a value >0
- If the URL is to a CSS style sheet, assign a high priority (CSS files may have a big impact on final layout)
- If the header of the resource indicates "image/(gif|jpg-|png)," the resource is likely an image, assign a medium-valued priority value (image sizes moderately affect final layout dimensions)
- If the time of the request is after a DOMReady event, assign a value→0 (events that happen after the DOM is loaded are less likely to affect layout)

In some embodiments, the prioritizer 208 is configured to determine a feature value for each feature of a resource. Feature values may be represented as numeric values, string values, categorical values, Boolean values (1 or 0), date values (e.g., date of most recent fetch), time values (e.g., time of most recent fetch), and/or the like. The priority generator 210 may then calculate resource priority for the resource based on the feature values. For example, numeric feature values of an object may be summed using the priority generator 210 to determine a resource priority for the object. The sum may be a weighted sum. The sum may be compared to a threshold. In general, priorities for the various features of an object may be represented as a feature array, for example feature array:

$$\vec{F} = (f_1, f_2 \ldots f_n)$$

Where each "$f_i$" is a feature value. Examples of the types of vales for any of the "$f_i$" in $\vec{F}$ include numeric values, string values, categorical values, Boolean values (1 or 0), date values (e.g., date of most recent fetch), time values (e.g., time of most recent fetch), and/or the like. The priority generator 210 may use various operations, functions, and/or transforms to evaluate the feature array $\vec{F}$ to generate a value for the priority of the object. The features of the feature array $\vec{F}$ may be summed to calculate a priority. In the example of summing numeric feature values of an object using the priority generator 210 to determine a resource priority P for the object:

$$P = \sum_1^n f_i$$

In some embodiments, the prioritizer 208 assigns parameters to each feature. These parameters may similarly be represented using a parameter or vector array.

$$\vec{A} = (a_1, a_2 \ldots a_n)$$

Where "$a_i$" is a parameter value corresponding to a feature. Examples of the types of vales for any of the "$a_i$" in $\vec{A}$ include numeric values, string values, categorical values, Boolean values (1 or 0), date values (e.g., date of most recent fetch), time values (e.g., time of most recent fetch), and/or the like. In some embodiments, the parameter array $\vec{A}$ represents a model and/or functions as a model for calculating resource priorities. The values of the array $\vec{A}$ may represent weights for each of the features, in which case the array $\vec{A}$ may be referred to as a weight vector. The priority generator 210 may calculate a weighted sum comprising a product of each element "$a_i$" of the parameter array $\vec{A}$ and a corresponding element "$f_i$" of the feature array $\vec{F}$ to produce a value P representing a resource priority of the object. For example, where P is the priority of an object:

$$P = \sum_1^n a_i f_i$$

The priority generator 210 may apply other functions to arrays $\vec{F}$ and $\vec{A}$ to generate a priority of the object. The parameters in the parameter array $\vec{A}$ may be evaluated and adjusted based on latency and/or accuracy of the rendering using training and metrics described elsewhere herein.

More generally, the priority generator calculates priorities according to:

$$\vec{P} = M(\vec{F}, \vec{A})$$

Where $\vec{P}$ is a priority array for one or more resource priorities, $\vec{F}$ is a feature array, $\vec{A}$ is a parameter array and M is a function of $\vec{F}$ and $\vec{A}$.

In some embodiments, the feature array $\vec{F}$ is a two dimensional array. In general, the rows may represent the resources and the columns may represent the features. An example is provided below in Table 1.

TABLE 1

| $\vec{F}$ | File size in K bytes | File type | Location | Font size | Font Color | Advert |
|---|---|---|---|---|---|---|
| URL | 1 | 0 | 3 | 0 | 0 | 1 |
| Image | 120 | 2 | 5 | 0 | 0 | 1 |
| Banner 1 | 1 | 12 | 1 | 24 | 4 | 0 |
| Banner 1 | 1 | 12 | 1 | 12 | 2 | 0 |

In Table 1, the rows represent a URL for a file resource to be fetched, an image resource "Image" and two banner resources "Banner 1" and "Banner 2." The columns represent features for each of the resources. The prioritizer 208 may evaluate features for each resource based on rules and/or values of the feature, and assign a value for the feature based on the evaluation. For example, the feature "file size" of Table 1 is evaluated based on the number of kilobytes in the file. In the example of Table 1, the file size for the URL is 1 kilobyte. The file sizes for the objects Image is 120K and Banner 1 and 2 are 1K.

The file type may be evaluated based on rules using the prioritizer 208. For example, the URL of Table 1 evaluates to 0 because there may be many types of files at the URL. The resource Image evaluates to 2 because images do not contain much information of interest to a particular end user. The resources Banner 1 and Banner 2 evaluate to 12, perhaps because they are both banners that contain information about the website of interest to the end user.

Similarly, the location features of the URL, Image, and Banner 1 and Banner 2 may be evaluated based on rules or estimates of latency. In some embodiments, feature values may be assigned using a look-up table. For example, in Table 1, the location feature for URL, Image, and Banner 1 and 2 may be evaluated based on a latency table (not illustrated) for downloading the respective resources. A latency table may be based on estimates or historical data.

URL and Image do not have an associated font size, so the entries may be set to 0 or left empty. Banner 1 has a font size of 24 points. Banner 2 has a font size of 12 points.

Similarly, URL and Image do not have an associated font color, so the entries may be set to 0 or left empty. Banner 1 has a font color of red, which is assigned a value of 4. Banner 2 has a font of green, which is assigned a value of 2. A look-up table may be used to assign feature values based on categorical variables, such as color.

The Advert feature indicates that a resource is or is not likely to be an advertisement. URL and Image are represented by 1 in Table 1 to indicate that they are likely to be advertisements. Banner 1 and Banner 2 are represented by a binary 0 in Table 1 to indicate that it is not an image.

An example of a parameter array $\vec{A}$ is provided below in Table 2. The prioritizer 208 may assign parameter values to the parameter array $\vec{A}$. The parameter array $\vec{A}$ of Table 2 may be used by the priority generator 210 for evaluating the feature array $\vec{F}$ of Table 1.

TABLE 2

| $\vec{A}$ | File size | File type | Location | Font size | Font Color | Advert |
|---|---|---|---|---|---|---|
| Parameter | 4 | 7 | 23 | 1 | 7 | −1000 |

For example, array $\vec{A}$ and array $\vec{F}$ may have dimension configured for multiplication, and the priority generator 210 may use a matrix multiplication of array $\vec{A}$ and array $\vec{F}$ to generate a priority array $\vec{P}$ (illustrated in Table 3 below representing a priority of −927 for URL, −391 for Image, 163 for Banner 1, and 138 for Banner 2.

TABLE 3

| $\vec{P}$ | Object Priority |
|---|---|
| URL | −927 |
| Image | −391 |
| Banner 1 | 163 |
| Banner 2 | 138 |

A threshold of 0 may be applied to the priorities of Table 3 to determine that URL and Image are not fetched but Banner 1 and 2 are fetched.

In some embodiments, the feature array $\vec{F}$ is an N dimensional array where N is 2 or greater. For example, where N=3, the array illustrated in Table 1 may further include two levels in the third dimension. The first level may represent feature values for determining whether or not to fetch resources. The second level may represent feature values for determining an order for fetching priorities. Similarly, the second level may represent a latency timeout value. In another embodiment, multiple levels may each represent feature values determined for alternative end users and/or use cases. The parameter array $\vec{A}$ and priority array $\vec{P}$ may be arrays having dimensions appropriate to the feature array $\vec{F}$, for example, N−1. Alternatively, feature values, parameters, and/or resource priorities may be stored in the form of one or more databases. The one or more databases may be accessed and used in assigning, calculating and evaluating priorities of features and/or resources.

In some embodiments, a priority value is determined for a resource using a decision tree. As described elsewhere herein.

In another embodiment, a deviation of the feature values from typical or standard values is calculated. For example, the parameter array $\vec{A}$ may represent typical or standard values for feature values. The priority generator 210 may calculate a score or priority based on a sum of the deviations between each parameter a corresponding feature value, e.g., using a matrix transforms and/or matrix multiplication. The resource manager 212 may evaluate the score for the resource as discussed elsewhere herein.

The resource manager 212 is configured to determine whether and/or when to fetch a resource based on its resource priority. The resource manager 212 is further configured to fetch a resource based on the determination. The resource priority may be used to determine whether or not to fetch the resource. For example, the assigned priority may indicate that the resource is to be fetched or not fetched. A flag (1 or 0) may be used. A flag of 1 may indicate that the object is to be fetched and a flag of 0 indicates that the object is not to be fetched. The flag may be part of a control word containing a plurality of flags.

In some embodiments, if the priority is a numeric value, the resource will be fetched based on a comparison of the priority and the threshold. In various embodiments, the resource will be fetched if the priority is: greater than; greater than or equal to; equal to; not equal to; less than or equal to; or less than the threshold. Similarly, a fetch decision may be based on a character representing a priority being equal or not equal to a reference character. In some embodiments, a threshold array T (not illustrated) includes a set of threshold values and/or characters. Each threshold value in the array T may correspond to a resource. Each threshold value may be compared to a priority for respective resource for determining whether or not to fetch the resource.

In some embodiments, resource manager 212 uses the resource priorities to determine an order for fetching resources. For example, a numeric value or character for the priority of the object may be used to determine an order for fetching the object. In some embodiments, the priority is used to determine both whether or not each resource is fetched and an order for the fetched resources. For example, upon determining that an object is to be downloaded, a numeric value or character for the priority of the object may be used to determine an order for downloading the object.

In some embodiments, the resource manager 212 uses the resource priorities as a timeout for fetching resources. The priority generator 212 may calculate and/or assign a timeout period for downloading each resource. For example, the timeout period for a resource may be the calculated priority for the resource in milliseconds. In various embodiments, each priority is used to calculate the timeout using a linear or non-linear function of the priority.

The resource manager 212 may initiate fetch of all the resources. For each resource, when the timeout period has elapsed if the resource has not been fetched then the rendering proceeds without the resource; the resource is omitted from the partial representation. Timeouts may be used to allow the partial rendering engine 112 to complete rendering the partial representation within a maximum latency time period. The timeout may function as a priority for a resource and may be equivalent to a priority.

In some embodiments, the timeouts may be scaled and/or offset together (e.g., in response to a detecting a change in network speed or as an adjustment calculated during training). An end user may use timeout scaling and/or offset to improve the quality of the partial representation or reduce the latency of the rendering in response to network and/or Internet conditions. Similarly, the timeouts may be altered using linear or non-linear functions.

In various embodiments, the functions of the prioritizer 208, priority generator 210, and resource manager 212 are shared and/or combined. For example, the prioritizer 208 may be configured to calculate a priority for each object, and the priority generator 210 may be configured to determine for each object if the object is to be selected for rendering the webpage or omitted from use in rendering the webpage, and/or determine an order based on the resource priority. The resource manager 212 may then fetch objects selected for rendering a webpage.

In some embodiments, the priority generator 210 is configured to determine whether and/or when to fetch a resource based on its resource priority, instead of the resource manager 212. In some embodiments, the priority generator 210 uses the resource priorities to determine an order for fetching resources, instead of the resource manager 212.

The model engine 214 is configured to use the interpreted source code and selected objects for generating a model of the webpage (e.g., a DOM).

The serializer 216 is configured to generate a partial representation of the webpage using the model generated by the model engine 214 and objects fetched by the model engine 214. The partial representation may be provided to the GUI 114 for painting to the display 118. The partial representation may be stored in storage 116. In some embodiments, the partial representation is handed off to another module for further analysis (e.g., the search engine crawler 108, the training system 106 and/or the like). While the partial rendering engine 112 is illustrated in FIG. 1 as being used in the browser 110 of the client device 104, the rendering engine may also be used in other systems such as the training system 106 and/or the search engine crawler 108. The training system 106 and/or the web search engine crawler 108 may further analyze the representation generated by the serializer 216 using various components, as described elsewhere herein.

Figure 3:
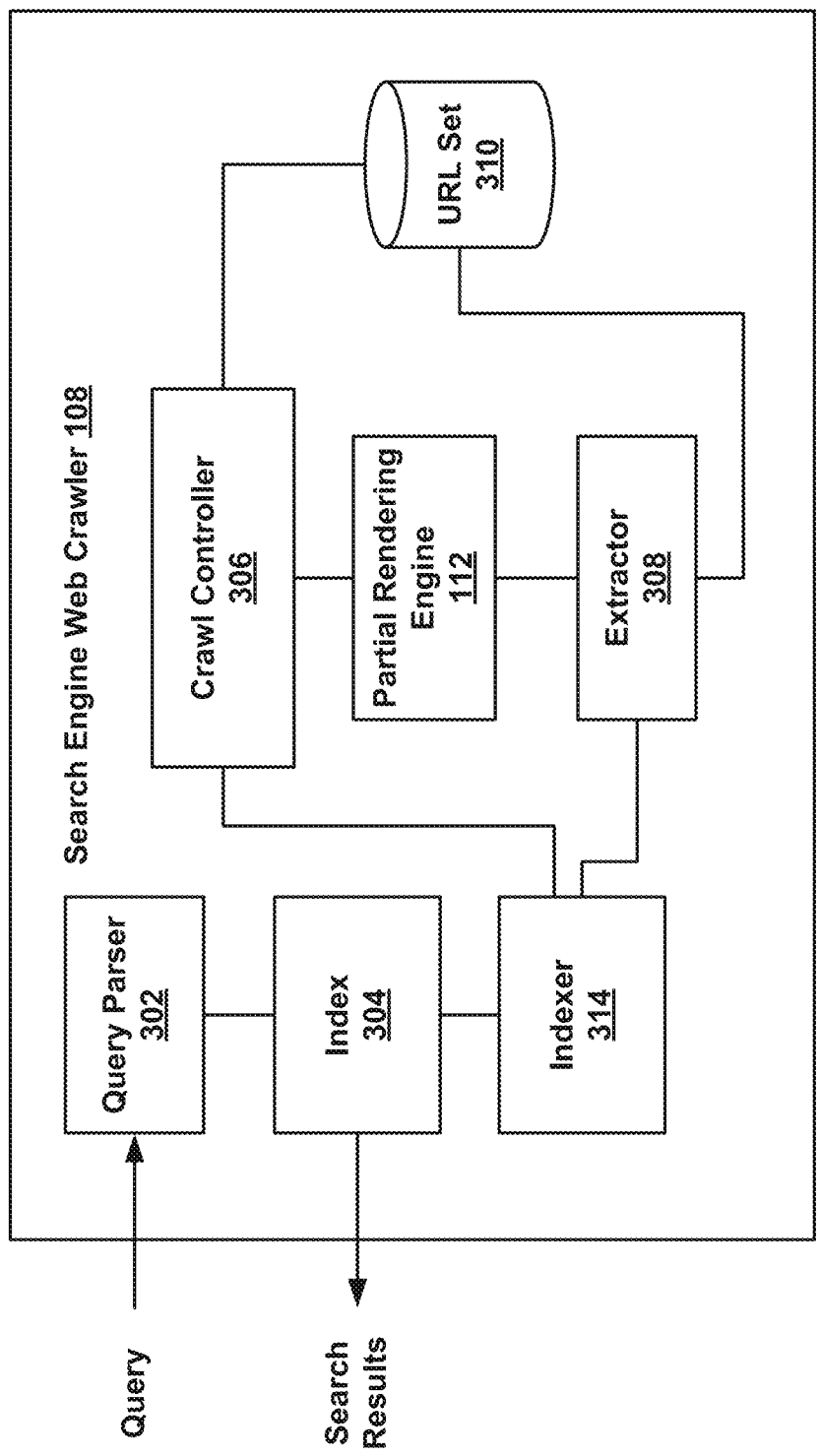
FIG. 3 is a block diagram illustrating details of a search engine crawler of FIG. 1, in accordance with various aspects of the technology.

FIG. 3 is a block diagram illustrating a search engine crawler 108 of FIG. 1, in accordance with various aspects of the technology. Search engine crawler 108 includes modules and/or hardware including a query parser 302, an index 304, an indexer 314, a crawl controller 306, an extractor 308, a URL set 310, and a partial rendering engine 112.

Search engine crawler 108 is configured to crawl a network (e.g., the architecture 100) and index webpages for a snapshot of the network. The crawl controller 306 is configured to fetch or receive a URL from the URL set 310 and provide the URL to the partial rendering engine 112 and the indexer 314. The partial rendering engine 112 may generate a partial render of the webpage as described elsewhere herein. The serializer 216 of the partial rendering engine 112 may provide a representation to the crawl controller 306 and the extractor 308.

The extractor is configured to extract a list of keywords and URL's from the rendered webpage. The extractor may provide the list of extracted keywords to the indexer 314 and provide the list of extracted URL's to the URL set 310. For each of the extracted keywords, the indexer 314 may add the URL to the keyword entry in the index 304. If the keyword does not occur in the index 304, the indexer 314 may add a new entry in the index for the keyword and URL. In some embodiments, the indexer 314 and the index 304 are combined as a single module.

The crawl controller 306 may fetch or receive another URL from the URL set 310. If the crawl controller 306 recognizes the URL as having been previously received and analyzed, the crawl controller 306 may skip the received URL and request another from the URL set 310. Optionally, the crawl controller 306 flags the previously received URLs to avoid fetching them again. In some embodiments, the crawl controller also receives a request from the fetcher 202 of the partial rendering engine 112 to fetch a webpage and/or resources. The crawl controller may fetch the requested webpage and/or resources via the network 102. In some embodiments, the crawl controller fetches the requested resources via AJAX or iframes.

As discussed elsewhere herein, not all the information at the URL provided to the partial rendering engine 112 is useful to the search engine crawler 108. Thus, it is not necessary for the partial rendering engine 112 to render all the information in webpage. By not fetching all the resources referenced in the webpage, the partial rendering engine 112 may substantially reduce the latency in rendering the webpage and still obtain all the useful information for the search engine crawler 108. In some embodiments, latency may be reduced by as much as three orders of magnitude or more.

The search engine crawler 108 may use the index 304 for processing a search query. The query parser 302 is configured to receive a query. The query may be received via the network 102 from an end user, for example from client device 104. The query parser 302 may parse and interpret a query. The query parser 302 may provide a list of keywords to the index 304 for searching. The index 304 may search the indexed keywords and return the search results as a list of URL's vial the network 102 to the end user. In some embodiments, the query parser 302 searches the indexed keywords and returns the search results as a list of URL's vial the network 102 to the end user.

The search engine and crawler components of FIG. 3 are illustrated as being a single unit. However, components of the search engine (e.g., query parser 302 and Index 304) may be separate from components of the web crawler (crawl controller 306, partial rendering engine 112, extractor 308, URL set 310, indexer 314.) In some embodiments, the index 304 is shared between the search engine and web crawler. In some embodiments, the index 304 is part of the search engine or the web crawler and communication is provided to the index 304. In some embodiments, the index 304 is a separate unit in communication with both the search engine and the web crawler. A separate Index 304 may be cloned in both the search and web crawler. The indexer 314 may provide for communication between the cloned indexes 304 and maintain the cloning.

Figure 4:
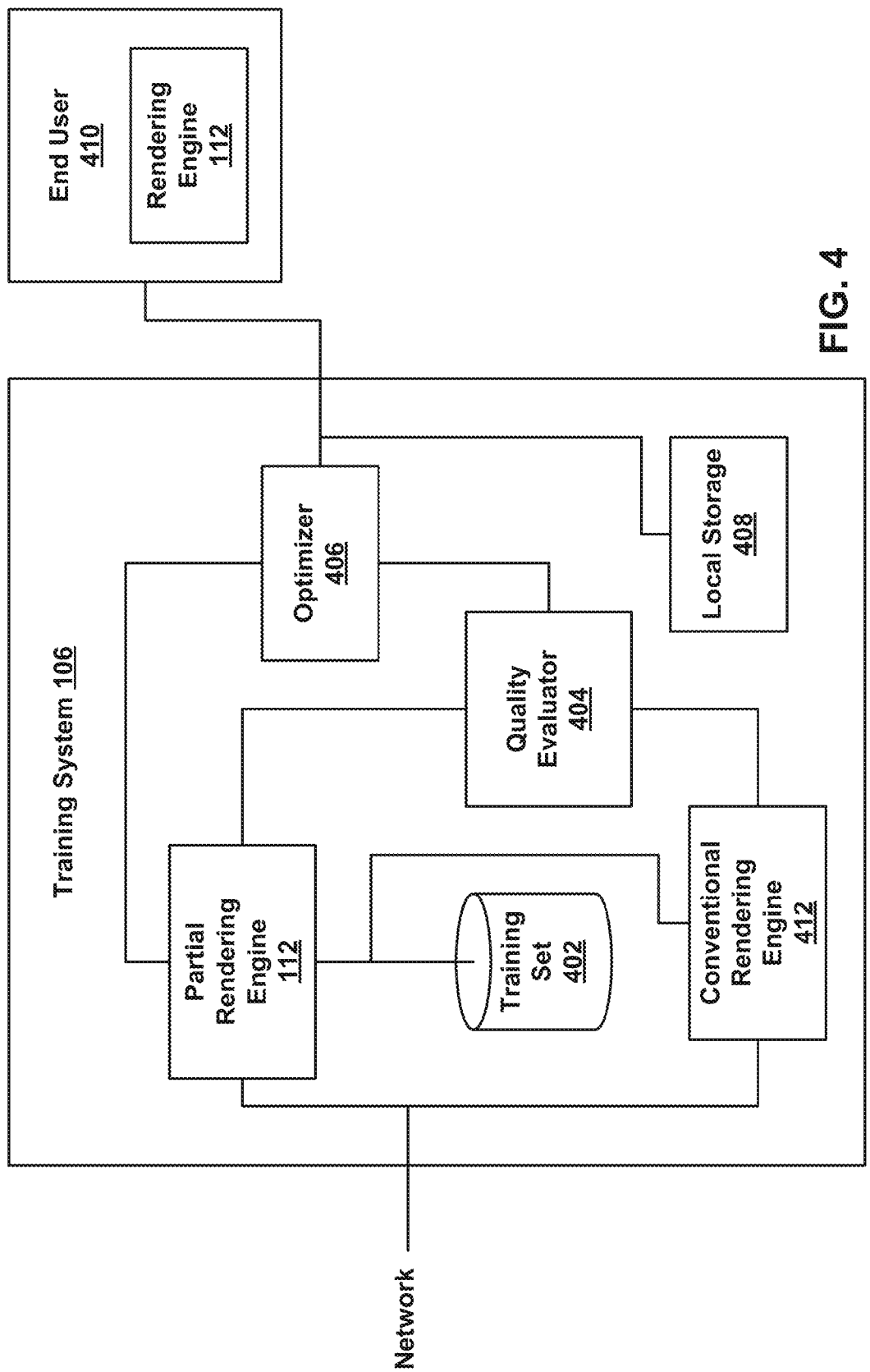
FIG. 4 is a block diagram illustrating details of a training system of FIG. 1, in accordance with various aspects of the technology.

FIG. 4 is a block diagram illustrating a training system 106 of FIG. 1, in accordance with various aspects of the technology. The training system 106 includes modules and/or hardware including a partial rendering engine 112, a training set 402, a quality evaluator 404, an optimizer 406, local storage 408, and a conventional rendering engine 412. The training system 106 may be in communication with an end user 410. In some embodiments, the training system 106 communicates with the end user 410 via the network 102. Examples of end users include the client device 104, the search engine crawler 108, a server 120, and/or the like. The end user 410 of FIG. 4 also includes a partial rendering engine 112.

The training set 402 includes a list of URL's each referencing a webpage 124 on a website 122 of a server 120. The URL's are provided to the partial rendering engine 112 and conventional rendering engine 412. The training system of FIG. 4 illustrates the training set 402 as being a local component of the training system 106. The training set may be stored in local storage 408. However, in various embodiments the training sets are stored in remote memory and/or streamed from the remote memory (e.g., a server 120, the cloud 130, an end user 410, a client device 104, a search engine crawler 108, and/or the like) via the network 102. Training sets may be prepared in advance by assembling a sample of representative webpages. In some embodiments, the training set 402 results from real-time activities. For example, the training set 402 may passed in dynamically in a running service (e.g., end user 410). The service may use recently passed-in workloads to self-optimize itself on the current stream of URLs it is processing. In some embodiments, the training set 402 is a module that is configured to monitor URL traffic across a channel (e.g., the network 102), for a server 120, in a cloud 130, to and from an end user 104, to and from a search engine, to and from a web-crawler, and/or the like).

For each URL in the list, the partial rendering engine 112 performs a partial render of the webpage as discussed elsewhere herein, and the conventional rendering engine 412 performs a faithful or ideal render of the same webpage. The partial rendering engine 112 may generate a partial representation of the webpage and provide an image of the partial representation to the quality evaluator 404. Similarly, for the same URL the conventional rendering engine 412 may generate a faithful or intended representation of the webpage. The intended representation of the webpage uses all related resources referenced in the files fetched from URL that were intended to be fetched in the design of the webpage and to be used for rendering the webpage. The conventional rendering engine 412 may provide an image of the intended representation to the quality evaluator 404.

The quality evaluator 404 is configured to use an objective function (e.g., cost function) to calculate a difference between a DOM rendered using the partial rendering engine 112 and the faithfully rendered DOM from a conventional rendering engine 412. The quality evaluator 404 may compare the image of the partial representation and the image of the intended representation. The quality evaluator 404 is further configured to calculate a difference between the partially rendered webpage and a faithfully rendered webpage. The quality evaluator 404 may provide a measure of the calculated difference to the optimizer 406.

The optimizer 406 is configured to make an adjustment to the partial rendering engine 112 based on the calculated difference. In some embodiments, the quality evaluator 404 and/or the optimizer 406 is configured to aggregate calculated differences for a plurality of URL's. The optimizer 406 may adjust the partial rendering engine 112 based on the aggregated differences. In some embodiments, the optimizer 406 is further configured to provide the results of the optimization to the end user 410 for use in the partial rendering engine 112 of the end user 410.

The adjustment may be made to parameters or a rule model used in the partial rendering engine 112 for calculating resource priorities. For example, a parameter array $\vec{A}$ and feature array $\vec{F}$ may be used for calculating a priority array $\vec{P}$, as described elsewhere herein. An adjustment of the parameter array $\vec{A}$ may be based on the calculated differences. In another example, a threshold array T may be used for determining whether to fetch corresponding resources. An adjustment of the threshold array T may be based on the calculated differences. In some embodiments, the optimizer 406 is configured to compare calculated differences for the same URL rendered using two different sets of values in the parameter array $\vec{A}$. The optimizer 406 may compare calculated differences for the same URL rendered using two different sets of values in the threshold array T. Similarly, the optimizer 406 may compare calculated differences for the same URL rendered using two different rule sets of a rule model.

An example of a cost function for calculating a difference between a DOM rendered (using the partial rendering engine 112) and the faithfully rendered DOM (using a conventional rendering engine 412) is an aggregate Euclidean distance (L2 norm) calculation. An aggregate Euclidean distance may be used to represent a sum of the distances between a plurality of corresponding rectangles in two images. For example, assuming rectangle R1(x1,y1,x2,y2) representing an element in a first image and R2(x1,y1,x2,y2) representing an element in a second image, there may be a number of distance metrics for calculating the distance between the two rectangles. One of the distance metrics is a distance between the two centers. Another distance metric is an amount of overlap in pixels between the two rectangles. Another distance metric is sqrt((R1$x$1−R2$x$1)^2+(R1$y$1-R1$y$2)^2)+sqrt((R1$x$2−R2$x$2)^2+(R1−$y$2−R2$y$2)^2). Another is a shortest distance between two edges. Any of these distance metrics may be used for calculating a sum of the distances between a plurality of associated rectangles in two images. In some embodiment, the calculated sum is a weighted sum.

In some embodiments, the optimizer 406 is configured to make an adjustment to the partial rendering engine 112 using a logistic regression, deep learning network, random forest, support vector machine, Bayesian network, and/or the like. Regression techniques maybe used to fit a model on the parameter arrays A to predict the distance error. Additionally the distance metric can also be thresholded to {0, 1} and classification techniques can be applied.

Figure 5:
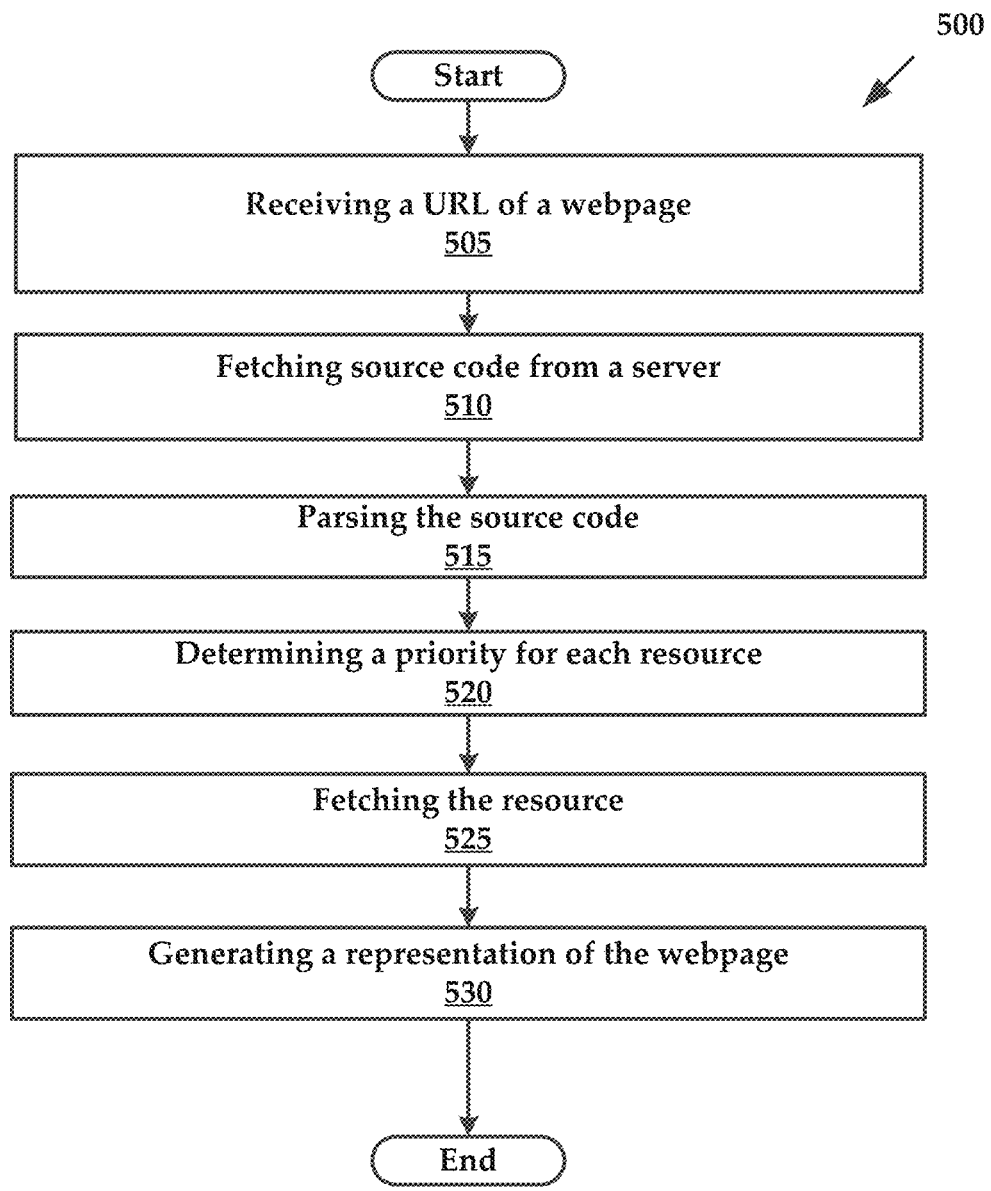
FIG. 5 is a flowchart of an exemplary method for rendering a webpage, in accordance with various aspects of the technology.

FIG. 5 is a flowchart of an exemplary method 500 for rendering a webpage, in accordance with various aspects of the technology. The method 500 may comprise the step 505 of receiving a URL of a webpage. In various embodiments, the URL is received from an end user, a training set, a web crawler URL set, and/or the like. In various embodiments, the URL is received from a client device via a GUI (e.g., GUI 114), from a website on a server (e.g., server 120) via a network (e.g., network 102) from local or remote memory, from mass storage, and/or the like.

To access source code describing the webpage, the method may comprise the step 510 of fetching a file including the source code from a server designated by the URL. The file may be fetched via a network (e.g., network 102) from a website on a server (e.g., server 120).

Upon fetching the file from the server, the method may comprise step 515 of parsing the source code to catalog resources used for rendering the webpage.

To determine whether or not to fetch each resource, the method may comprise the step 520 of determining a priority for each of the cataloged resource.

If the priority equals or exceeds a threshold of a resource, the method may comprise the step 525 of downloading the resource. If the priority does not exceed the threshold then the step 525 of the method may comprise omitting the resource.

The method may further comprise the step 530 of generating a representation of the webpage using the downloaded resources.

Figure 6:
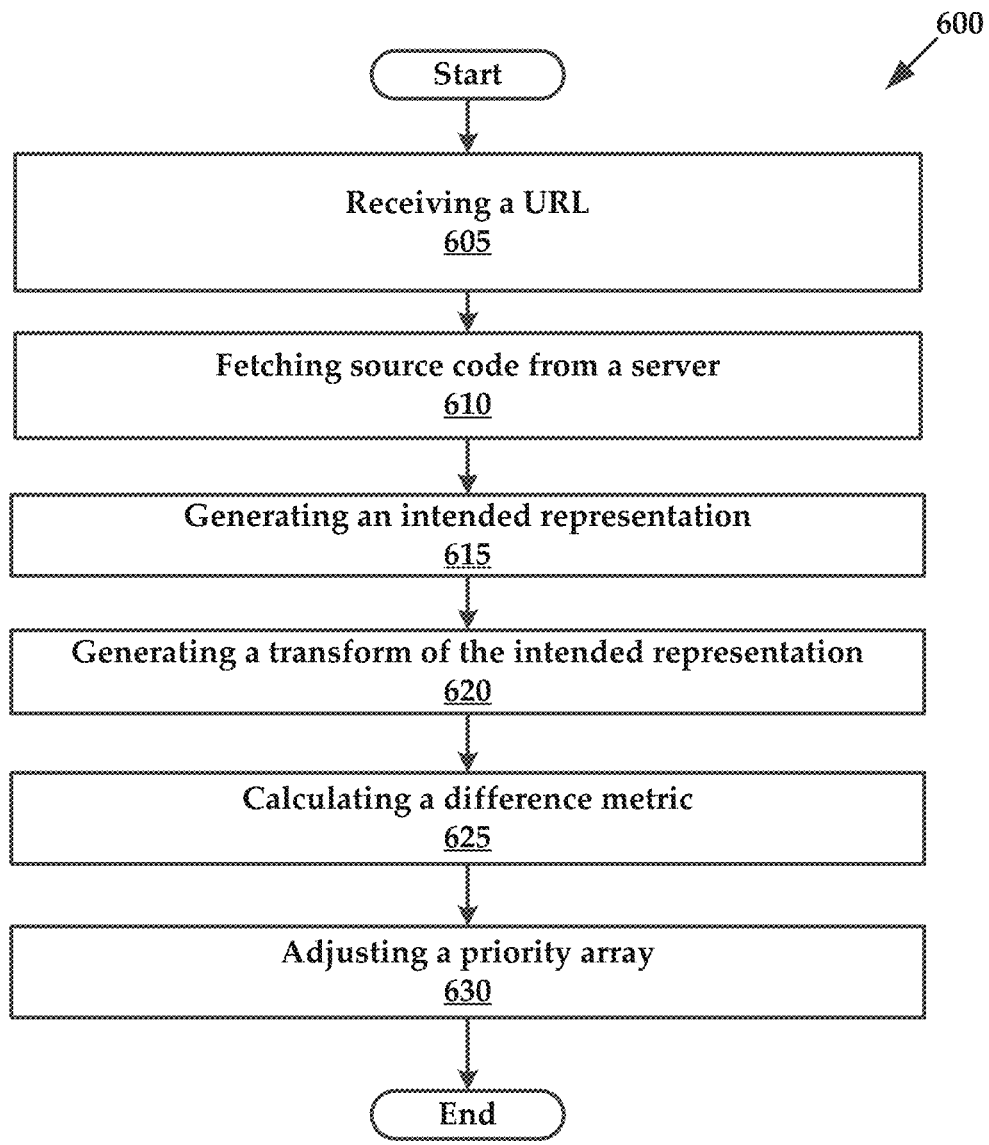
FIG. 6 is a flowchart of an exemplary method for training a webpage rendering engine, in accordance with various aspects of the technology.

FIG. 6 is a flowchart of an exemplary method 600 for training a webpage rendering engine, in accordance with various aspects of the technology. The method 600 may comprise the step 605 of receiving a URL of a webpage. In various embodiments, the URL is received from an end user, a training set, a web crawler URL set, and/or the like. In various embodiments, the URL is received from a client device via a GUI (e.g., GUI 114), from a website on a server (e.g., server 120) via a network (e.g., network 102) from local or remote memory, from mass storage, and/or the like.

To access source code describing the webpage, the method may comprise the step 610 of fetching a file including the source code from a server designated by the URL. The file may be fetched via a network (e.g., network 102) from website on a server (e.g., server 120).

Upon fetching the file from the server, the method may comprise the step 615 of generating an intended representation of the webpage using a conventional rendering engine to render the source code. The conventional rendering engine may be used for parsing the source code, cataloging resources intended to be used for rendering the webpage, and fetching all the resources intended to be used for rendering the webpage.

The method may also include the step 620 of generating a transform of the intended representation for the webpage using a partial rendering engine to render the same source code as rendered using the conventional rendering engine. The partial rendering engine may be used for parsing the source code, cataloging resources intended to be used for rendering the webpage, calculating a priority for each of the cataloged resources using a priority array, selecting resources to be cataloged based on the calculated priorities, the selected resources not including all the resources intended to be used, and fetching the selected resources. The transform of the intended representation uses the source code (instead of the intended representation) for generating the transform That is, the intended representation is not transformed directly to arrive at a representation that is a transformation of the intended representation. Nonetheless, the transformed representation and the intended representation differ as a result of resources that are omitted from the transformed representation. Thus, omitting the same resources from the intended representation may serve to transform the intended representation into the same representation as generated in method step 620.

Upon generating two different representations of the webpage, the method may comprise the step 625 of calculating a difference metric between the intended representation and the transform representation. In various embodiments, the step 625 may use linear regression ("weighted sum") logistic regression, deep learning network, random forest, support vector machine, Bayesian network, and/or the like for calculating the difference metric.

The method also includes the step 630 of adjusting the priority array based on the difference metric. In some embodiments, calculating a priority in the step 620 for each of the cataloged resources is performed using a decision tree instead of the priority array. The decision tree may be constructed using feature values. A score may be computed for the resource based using the decision tree. The decision tree may be adjusted in step 630 based on the difference metric.

In another embodiment, a deviation parameter array $\bar{A}$ is used for calculating the priority array in step 620. The deviation parameter array $\bar{A}$ may be used for calculating a deviation of the feature values from typical or standard values. For example, the deviation parameter array $\bar{A}$ may represent typical or standard values for a feature value. The priority generator 210 may calculate a score or priority based on a sum of the deviations between each parameter a corresponding feature value. The resource manager 212 may evaluate the score determine priorities for each resource of the priority array. The parameter array $\bar{A}$ may be adjusted in step 630 based on the difference metric.

In some embodiments, a parameter array $\bar{A}$ may be used in conjunction with a feature array $\vec{F}$ as described above with respect to FIG. 2 to calculate a priority array $\vec{P}$ in step 620. The parameter array $\bar{A}$ may be adjusted in step 630 based on the difference metric.

FIG. 7 illustrates an exemplary computing device 700 that may be used to implement an embodiment of the present systems and methods. The system 700 of FIG. 7 may be implemented in the contexts of the likes of computing devices, networks, servers, or combinations thereof. The computing device 700 of FIG. 7 includes one or more processors 710 and main memory 720. Main memory 720 stores, in part, instructions and data for execution by processor 710. Main memory 720 may store the executable code when in operation. The system 700 of FIG. 7 further includes a mass storage device 730, portable storage device 740, output devices 750, user input devices 760, a display system 770, and peripheral devices 780. In some embodiments, main memory 720 is used by storage 116 for storing data.

The components shown in FIG. 7 are depicted as being connected via a single bus 790. The components may be connected through one or more data transport means. Processor unit 710 and main memory 720 may be connected via a local microprocessor bus, and the mass storage device 730, peripheral device(s) 780, portable storage device 740, and display system 770 may be connected via one or more input/output (I/O) buses.

Mass storage device 730, which may be implemented with a magnetic disk drive or an optical disk drive, is a non-volatile storage device for storing data and instructions for use by processor unit 710. Mass storage device 730 may store the system software for implementing embodiments of the present technology for purposes of loading that software into main memory 720. In some embodiments, mass storage 730 is used by storage 116 for storing data.

Portable storage device 740 operates in conjunction with a portable non-volatile storage medium, such as a floppy disk, compact disk, digital video disc, or USB storage device, to input and output data and code to and from the computer system 700 of FIG. 7. The system software for implementing embodiments of the present technology may be stored on such a portable medium and input to the computer system 700 via the portable storage device 740. In some embodiments, portable storage device 740 is used by storage 116 for storing data.

User input devices 760 provide a portion of a user interface. User input devices 760 may include an alphanumeric keypad, such as a keyboard, for inputting alphanumeric and other information, or a pointing device, such as a mouse, a trackball, stylus, or cursor direction keys. Additional user input devices 760 may be comprised of, but are not limited to, devices such as speech recognition systems, facial recognition systems, motion-based input systems, gesture-based systems, and so forth. For example, user input devices 760 may include a touchscreen. Additionally, the system 700 as shown in FIG. 7 includes output devices 750. Suitable output devices include speakers, printers, network interfaces, and monitors.

Display system 770 may include a liquid crystal display (LCD) or other suitable display device. Display system 770 receives textual and graphical information, and processes the information for output to the display device.

Peripheral device(s) 780 may include any type of computer support device to add additional functionality to the computer system. Peripheral device(s) 780 may include a modem or a router.

The components provided in the computer system 700 of FIG. 7 are those typically found in computer systems that may be suitable for use with embodiments of the present technology and are intended to represent a broad category of such computer components that are well known in the art. Thus, the computer system 700 of FIG. 7 may be a personal computer, hand held computing device, telephone, mobile computing device, workstation, server, minicomputer, mainframe computer, or any other computing device. The computer may also include different bus configurations, networked platforms, multi-processor platforms, etc. Various operating systems may be used including Unix, Linux, Windows, Mac OS, Palm OS, Android, iOS (known as iPhone OS before June 2010), QNX, and other suitable operating systems.

It is noteworthy that any hardware platform suitable for performing the processing described herein is suitable for use with the systems and methods provided herein. Computer-readable storage media refer to any medium or media that participate in providing instructions to a central processing unit (CPU), a processor, a microcontroller, or the like. Such media may take forms including, but not limited to, non-volatile and volatile media such as optical or magnetic disks and dynamic memory, respectively. Common forms of computer-readable storage media include a floppy disk, a flexible disk, a hard disk, magnetic tape, any other magnetic storage medium, a CD-ROM disk, digital video disk (DVD), any other optical storage medium, RAM, PROM, EPROM, a FLASHEPROM, any other memory chip or cartridge.

Computer program code for carrying out operations for aspects of the present technology may be written in any combination of one or more programming languages, including an object oriented programming language such as Python, Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be coupled with the user's computer through any type of network, including a local area network (LAN) or a wide area network (WAN), or the connection may be made to an external computer (for example, through the Internet using an Internet Service Provider).

Figure 8:
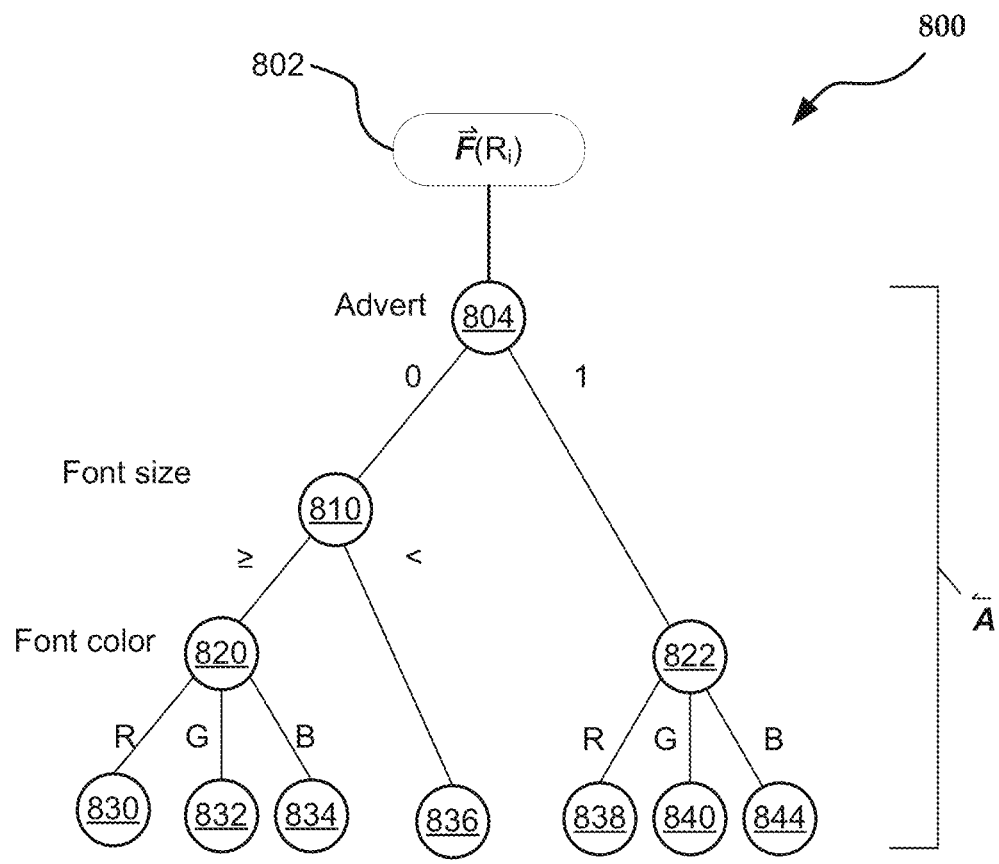
FIG. 8 illustrates a decision tree constructed using feature values, in accordance with various aspects of the technology.

FIG. 8 illustrates a decision tree 800 constructed using feature values. A score may be computed for the resource based walking the decision tree 800. The decision tree 800 includes node 804 at the first level, node 810 at the second level, node 820 and 822 at the third level, and leaves 830-844.

The decision tree 800 is configured to perform an operation M for evaluating an $i^{th}$ row [$\vec{F}(R_i)$] of a feature matrix $\vec{F}$ for the operation:

$$\vec{P} =_{M(\vec{F},\vec{A})}$$

Or $$\vec{P}_i =_{M(\vec{F}(R_i),\vec{A})}$$

Where $\vec{P}_i$ is the priority for the $i^{th}$ resource of a priority array $\vec{P}$, $\vec{F}$ is a feature array, $\vec{A}$ is a parameter array and M is a function or operation for evaluating $\vec{F}$ and $\vec{A}$. FIG. 8 illustrates an exemplary evaluation of a row $R_i$ for a Banner that includes the features of an advertisement, a font size, and a color. Table 4 is an example an $i^{th}$ row a feature array $\vec{F}$, namely row $\vec{F}(R_i)$

TABLE 4

| $\vec{F}(R_i)$ | Advert | Font size | Font Color |
| --- | --- | --- | --- |
| Banner | 0 | 36 | Green |

Table 5 is an example of parameter array $\vec{A}$ for evaluating the $i^{th}$ row of a priority array $\vec{P}$:

TABLE 5

| $\vec{A}$ | Advert | Font size | Font Color |
| --- | --- | --- | --- |
| Parameter | Yes = 1, No = 0 | Font < 24 points; evaluate color Font >= 24 points; P = Point size | Red = 5, Green = 10, Blue = 4 |

Node 804 represents a Boolean operation. The operation M may be illustrated by walking the tree 800. At node 804, if Banner is an advertisement, then proceed to node 822. If Banner is not an advertisement then proceed to node 810. Since Banner=0, it is not an advertisement so the operation M proceeds to node 810.

Node 810 evaluates a numerical value against a threshold. If the font size is greater than or equal to 24 then proceed to node 820. At node 810, if the font size is less than 24 points then proceed to leaf 836. Since the Banner font size=36, the operation M proceeds to node 820.

Nodes 820 and 822 evaluate a categorical value (red, green blue). The priority is a function of the color. In the example of FIG. 8, if Banner is red, leaves 380 and 838 set the priority to 5. If Banner is green, leaves 832 and 840 set the priority to 10. If Banner is blue, leaves 834 and 844 set the priority to 4. Since the Banner font is green the operation M proceeds to leaf 832. At leaf 832, the priority for Banner is set to 10.

In some embodiments, leaves 830-844 the priority for $\vec{P}_i$ may be set to the font size. Alternatively the priority may set according to a function of the font size (e.g., using a linear function, step function, non-linear function, a lookup table, and/or the like).

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the present technology in the form disclosed. Many modifications and variations will be apparent to those of ordinary skill in the art without departing from the scope and spirit of the present technology. Exemplary embodiments were chosen and described in order to best explain the principles of the present technology and its practical application, and to enable others of ordinary skill in the art to understand the present technology for various embodiments with various modifications as are suited to the particular use contemplated.

Aspects of the present technology are described above with reference to flowchart illustrations and/or block diagrams of methods, apparatus (systems) and computer program products according to embodiments of the present technology. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present technology. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While various embodiments have been described above, it should be understood that they have been presented by way of example only, and not limitation. The descriptions are not intended to limit the scope of the technology to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the technology as defined by the appended claims and otherwise appreciated by one of ordinary skill in the art. The scope of the technology should, therefore, be determined not with reference to the above description, but instead should be determined with reference to the appended claims along with their full scope of equivalents.

What is claimed is:

1. A method for rendering a webpage, the method comprising:

receiving a URL of the webpage;

fetching a file from a server designated by the URL, the file including source code describing the webpage;

parsing the source code to catalog a plurality of resources used for rendering the webpage;

extracting a plurality of features for each of the cataloged resources;

generating a feature vector including a cell for each of the extracted features of each of the cataloged resources;

assigning a feature value to each cell of the feature vector based on the feature for the respective cataloged resource;

generating a parameter vector including a feature parameter for each feature of the feature vector;

calculating a score representing a priority for each cataloged resource based on a vector product of the feature vector and the parameter vector;

for each cataloged resource, downloading the resource if the priority exceeds a threshold and omitting the resource if the priority does not exceed the threshold; and generating a representation of the webpage using the downloaded resources, the generated representation being a transformation of an intended representation for the webpage.

2. The method according to claim 1, wherein one or more feature values are determined according to a rule.

3. The method according to claim 1, further comprising:
including a second feature parameter in the parameter vector for each feature of the feature vector; and
calculating a second score representing a second priority for each cataloged resource using the second feature parameters included in the parameter vector.

4. The method according to claim 3, further comprising determining an order for downloading each downloaded resource based on the second score calculated for the respective downloaded resource.

5. The method according to claim 1, wherein one or more feature values are assigned according a rule.

6. The method according to claim 1, wherein
the vector product of the feature vector and the parameter vector is a weighted sum of the feature values assigned to feature vector.

7. The method according to claim 1, further comprising:
calculating an aggregate Euclidean distance from each rectangle in the transformed representation of the webpage to an associated rectangle in the intended representation of the webpage; and
adjusting feature parameters for one or more features of the feature vector based on the calculated aggregate Euclidean distance.

8. The method according to claim 1, further comprising displaying the generated representation of the webpage on a screen of a smart phone.

9. The method according to claim 1, further comprising:
calculating a distance from each rectangle in the transformed representation of the webpage to an associated rectangle in the intended representation of the webpage; and
adjusting feature parameters for one or more features of the feature vector based on the calculated distance.

10. The method according to claim 9, wherein the calculated distance is an aggregate Euclidean distance.

11. A method for training a webpage rendering engine, the method comprising:
receiving a URL of a webpage;
fetching a file from a server designated by the URL, the file including source code describing the webpage;
generating an intended representation of the webpage using a conventional rendering engine for:
parsing the source code,
cataloging resources intended to be used for rendering the webpage, and
fetching all the resources intended to be used for rendering the webpage;
generating a transform of the intended representation for the webpage, the transform representation generated using a partial rendering engine for:
parsing the source code,
cataloging resources intended to be used for rendering the webpage,
extracting a plurality of features for each of the cataloged resources;
generating a feature vector including a cell for each of the extracted features of each of the cataloged resources,
assigning a feature value to each cell of the feature vector based on the feature for the respective cataloged resource,
generating a parameter vector including a feature parameter for each feature of the feature vector,
calculating a priority for each of the cataloged resources using a product of the feature vector and the parameter vector,
selecting resources to be fetched based on the calculated priorities for the cataloged resources, the selected resources not including all the resources intended to be used, and
fetching the selected resources;
calculating a difference metric between the intended representation and the transform representation; and
adjusting one or more feature parameters of the parameter vector based on the difference metric.

12. A system for rendering a webpage, the system comprising non-transitory computer readable storage media having program modules embodied thereon, the program modules being executable by a processor to perform a method for rendering the webpage, the program modules comprising:
a fetcher module configured to receive a URL of the webpage and fetch a file from a server designated by the URL, the file including source code describing the webpage;
a parser module configured to parse the source code and catalog a plurality of objects to be used for rendering the webpage upon being fetched;
a feature extractor module configured to extract a plurality of features from the cataloged objects;
a prioritizer module configured to generate:
a feature vector and assign a feature value to each entry in the feature vector for each of the plurality of extracted features of each of the plurality of cataloged objects, each assigned feature value in the feature vector based on the feature for the respective cataloged object, and
a parameter vector including a feature parameter for each feature of the feature vector;
a priority generator module configured to calculate a resource priority for each of the plurality of cataloged objects based on a vector product of the feature vector and the parameter vector;
a resource manager module configured to determine for each of the plurality of cataloged objects if the cataloged object is to be selected for use in rendering the webpage or omitted from use in rendering the webpage, the decision based on the calculated resource priority for the cataloged object, the resource manager further configured to fetch the objects selected for rendering the webpage;
a model engine configured to generate a document object model using the fetched objects and the calculated priority for the respective object; and
a serializer module configured to render a partial representation of the webpage using the document object model and the fetched objects.

13. The system according to claim 12, wherein the resource manager module is further configured to determine an order for fetching the selected objects based on the calculated resource priority for the selected objects.

14. The system according to claim 12, wherein the system is configured to display the rendered partial representation of the webpage on a screen of a smart phone.

15. The system according to claim 12, wherein the feature extractor module is further configured to calculate a value for each feature for each the cataloged objects based on a deviation of the assigned feature value of the extracted feature from a reference value for the feature.

16. The system according to claim 15, further comprising:
a quality evaluator module configured to calculate a difference between the partial representation of the webpage and an intended representation of webpage; and an optimizer configured to adjust one or more feature parameter of the feature vector.

17. The system according to claim 15, wherein the priority generator module is further configured to calculate a score for each cataloged object representing a weighted sum of the assigned feature values for the cataloged object and the feature parameters of the feature vector, the priority for each cataloged object based on the score calculated for the cataloged object.

18. The system according to claim 17, wherein the resource manager module is further configured to evaluate the priorities calculated for each of the selected objects and determine an order for fetching the selected objects based on the relative priorities.

19. The system according to claim 17, wherein the resource manager module is further configured to compare the calculated priority for each cataloged object to a threshold and determine if the cataloged object is to be used for rendering the webpage based on the comparison.

20. The system according to claim 19, further comprising:
a quality evaluator module configured to calculate a difference between the partial representation of the webpage and an intended representation webpage; and
an optimizer module configured to assign a threshold to each cataloged object based on the determined difference.

21. The system according to claim 19, further comprising:
a quality evaluator module configured to calculate a difference between the partial representation of the webpage and an intended representation of webpage; and
an optimizer module configured to assign a weight to each feature parameter of the feature vector based on the determined difference.

22. The system according to claim 21, wherein a distance calculated by a statistical machine is an aggregate Euclidean distance of each rectangle in the partial representation of the webpage from an associated rectangle in the intended representation of the webpage.

23. The system according to claim 12, wherein:
the generated feature vector comprises:
a plurality of rows representing the cataloged objects, each row representing a cataloged object;
a plurality of columns representing features, each column representing a feature;
each cell of the vector including a feature value based on the feature for the respective object; and
the parameter vector includes a feature parameter for each column of the feature vector.

24. The system according to claim 23, wherein the priority generator module is further configured to calculate a resource priority for each row of the feature vector, the resource priority comprising a vector product of the feature vector and the parameter vector.

* * * * *